United States Patent [19]

Ask

[11] 4,436,009
[45] Mar. 13, 1984

[54] SAW UNIT HAVING MUTUALLY DISPLACEABLE SAW PARTS

[76] Inventor: Jonas W. Ask, Skogsstigen 10, S-183 50 Täby, Sweden

[21] Appl. No.: 237,978

[22] Filed: Feb. 25, 1981

Related U.S. Application Data

[63] Continuation-in-part of Ser. No. 160,177, Jun. 17, 1980, abandoned.

[51] Int. Cl.³ ............................................. B27B 5/29
[52] U.S. Cl. .......................................... 83/72; 83/661; 83/676; 83/836
[58] Field of Search ............ 83/72, 661, 676, 835–855; 30/346, 355; 144/236, 237; 29/79

[56] References Cited

U.S. PATENT DOCUMENTS

| | | | |
|---|---|---|---|
| 907,168 | 12/1908 | Neill | 83/835 |
| 3,327,696 | 6/1967 | Aiken et al. | 83/72 X |
| 3,872,763 | 3/1975 | Kayahara | 83/835 |
| 3,986,543 | 10/1976 | Slayton et al. | 144/236 |

FOREIGN PATENT DOCUMENTS 2260840  6/1974  Fed. Rep. of Germany ........ 83/676

Primary Examiner—James M. Meister
Attorney, Agent, or Firm—Burns, Doane, Swecker & Mathis

[57] ABSTRACT

A saw unit, especially for wood machining, comprises two saw parts, the sawteeth alternately connected to one or the other saw part. The saw parts are mutually displaceable in the direction of tooth travel and/or in the direction of travel of the object being sawed to adjust the relative positions of the teeth. Thus, the cutting effect can be varied at both saw parts. Thus, the side-forces in the saw cut can be controlled in a desired way during sawing to enable the saw unit to be steered in a desired manner.

10 Claims, 20 Drawing Figures

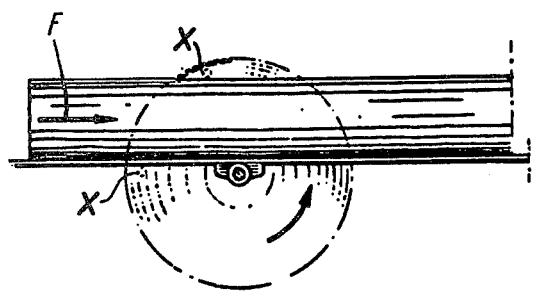
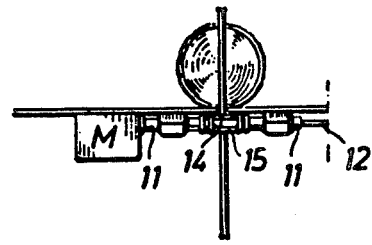
FIG. 3  FIG. 4
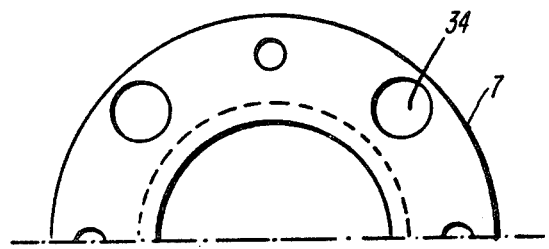
FIG. 5
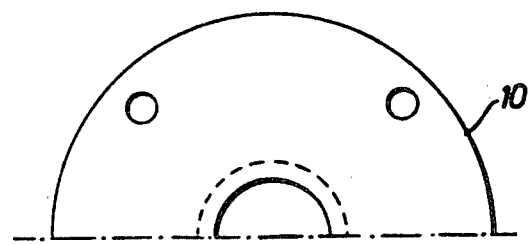
FIG. 6

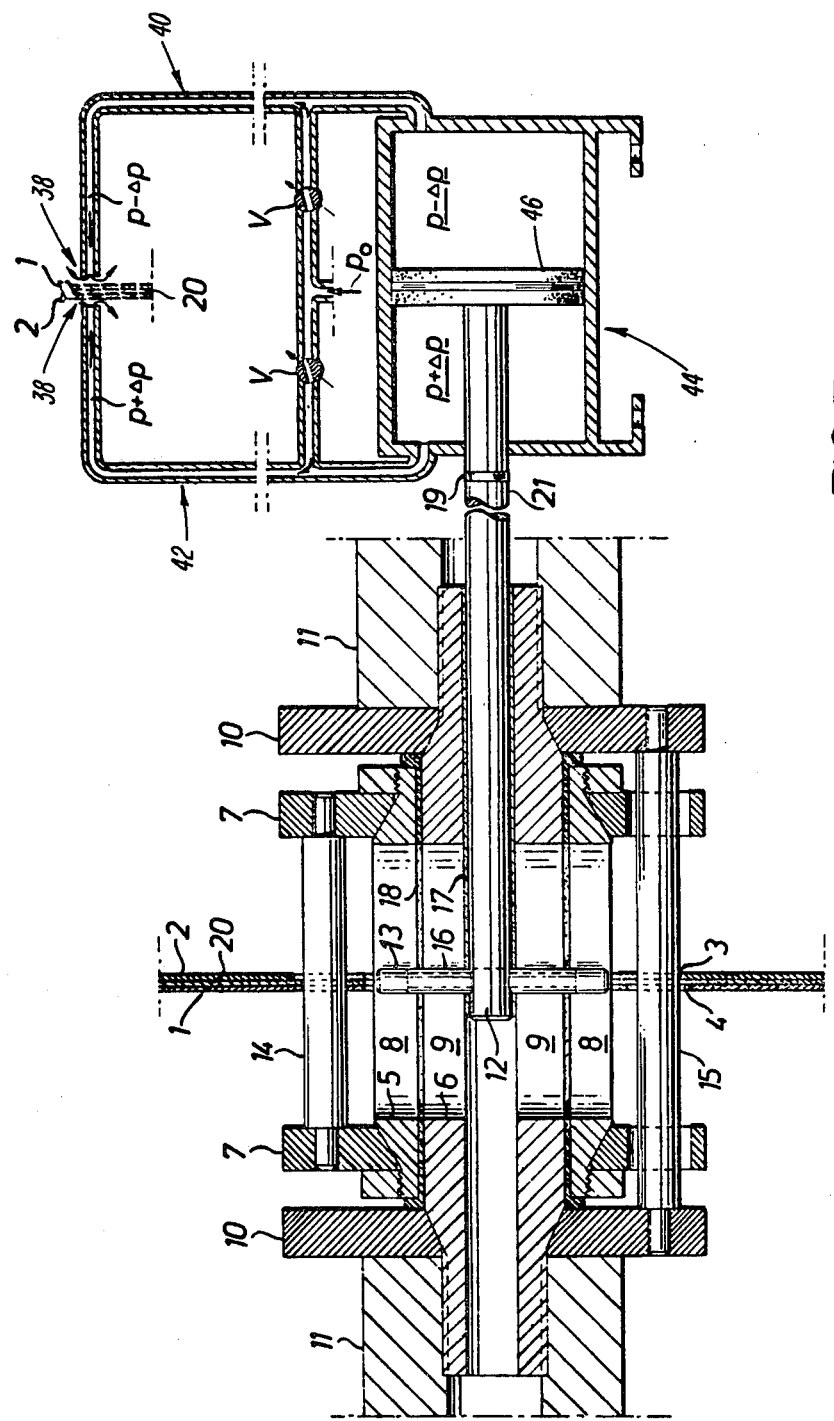

SAW UNIT HAVING MUTUALLY DISPLACEABLE SAW PARTS

RELATED APPLICATIONS

This is a continuation-in-part of copending U.S. Application Ser. No. 160,177 filed on June 17, 1980, now abandoned.

BACKGROUND AND OBJECTS OF THE INVENTION

The stability of a straight or a circular sawblade is affected by the cutting forces of the sawteeth. It is depending upon the form, tension and material of the blade. The main reason for deviations from an ideal cut are the sideforces acting against the sawteeth. Those forces originate from assymetric or deformed teeth and from the variable texture and hardness of the workpiece (saw timber). Due to variations in the workpiece there always will occur, even with an ideal toothform, sideforces followed by bending of the blade.

Also the cutting force components in the sawplane perpendicular to the tooth-movement, often called feedingforce and generally directed towards the tooth, imparts a buckling effect and an additional side force. If the body of the blade is not stiff enough this causes a critical deflection.

When sawing material with pronounced texture like wood, blades with great stiffness are used. This is brought about by using strong pretensioning and material with considerable thickness and stiffness. The sawblades of today with these fixed attributes can be considered as passive tools. A forced disturbance cannot be eliminated, it can only be counteracted by reaction forces due to the side displacement of the tooth front.

It is an object of the present invention to provide a saw unit which can be effectively steered.

SUMMARY OF THE INVENTION

The present invention provides for the exertion of an active control on the cutting course by using two mechanically separated groups of teeth, e.g., on separate saw blades, which shall be similary assymetrically formed and mirror images of one another. The tooth-pitch is equal in both groups. In the case of circular blades, there are the same number of teeth in both blades. The one group of teeth are arranged intermittently with the other group of teeth. The groups are mutually changeable in position.

By a change of position of the teeth, specific and required effects can be achieved. For example, in a circular saw, if a tooth of one group is moved further radially outward than the tooth of the other group, the former will make a deeper cut and exert a greater influence on the direction of the sawcut to the right or the left. If such a position change is made in a proper way, the radially outward teeth will exert a counteracting effect on the forces which emanate from, for example, the inclined texture of the workpiece. The same effect can also be achieved if the teeth of one of the sawgroups are disposed circumferentially closer to the teeth of the other group.

THE DRAWINGS

The objects and advantages of the invention will become apparent from the following detailed description of a preferred embodiment thereof, in connection with the accompanying drawings in which like numerals designate like elements, and in which:

FIG. 3 is a side view of the saw unit cutting a workpiece;

FIG. 4 is an end view of the assembly depicted in FIG. 3;

FIG. 5 is a side view, of one half of a flange to which one balde is drivingly connected;

FIG. 6 is a side view of one half of a flange to which the other blade is drivingly connected;

FIG. 7 is a longitudinal sectional view through a drive and adjustment mechanism for the saw unit, as well as a sensing unit for controlling the adjusting mechanism;

DETAILED DESCRIPTION OF A PREFERRED EMBODIMENT OF THE INVENTION

A preferred embodiment of the invention is described below in connection with circular saws. However, the invention, with suitable modifications, can also be used on other forms of saws such as band-saws, gang-saws, or tenon-saws.

Figures 1, 2:
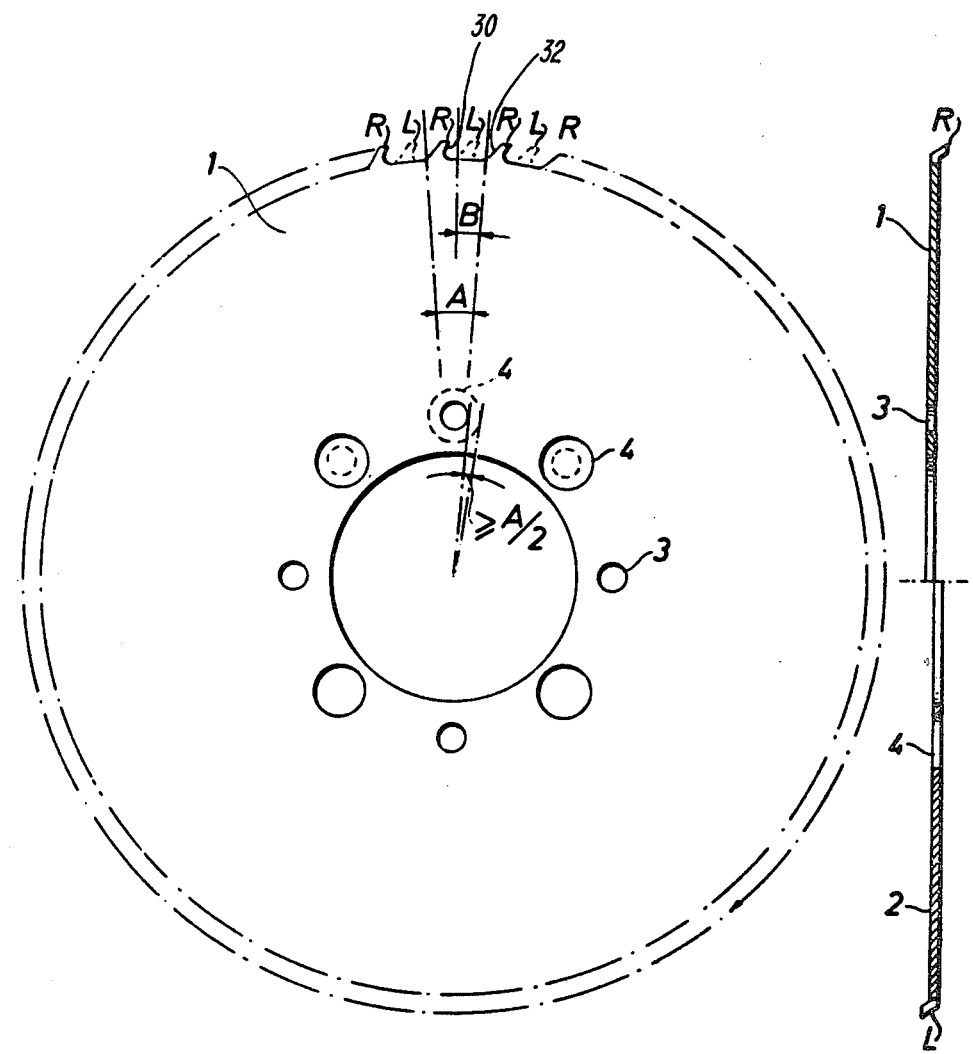
FIG. 1 is a side elevational view of a saw unit according to one preferred embodiment of the present invention, one blade being depicted in solid lines, the other in broken lines.
FIG. 2 is an end view of the embodiment depicted in FIG. 1, wherein only one half of each blade is depicted.

In FIGS. 1 and 2, two identical but mutually reversed, circular saws or blades 1, 2 are shown. The saws 1, 2 have equal thickness, diameter and number N of teeth L,R, i.e., a tooth-pitch $A = 360/N$ degrees. In FIG. 1, one circular saw is in solid lines and the other in dashed lines with "neutral" relationship of the teeth being defined by the teeth of one saw disposed circumferentially midway between adjacent teeth R of the other saw (i.e., $B = A/2$ degrees), and by the teeth L,R being at the same radial distance from the coaxial saw centers.

In FIG. 2 is shown half a cross-section of the two saws, with one of many possible tooth designs, i.e., the teeth L,R are assymetrical, uniform and mirrorreflections of one another in front view. Separate rotational drive of the saws is achieved by steering-pins 14, 15 which are circularly arranged and described in detail in FIGS. 5, 6, and 7. The saws are driven at identical speeds, the separate drives being needed to enable the teeth to be mutually adjusted, as will become apparent.

An arbitrary number of steering-pins are mounted for slight free-wheeling in mounting holes 3 in the saw 1, and are given substantial clearance in bigger, circular holes 4 in the saw 2, which holes 3, 4 are aligned in the afore defined neutral position of the saws. The steering-pins of the two systems are thus able to freely rotate relative to each other and relative to the center of the axis of the saws whereby the saws can be mutually adjusted as described below, e.g., adjusted in pitch whereby angle B can be bigger or less than A/2. When, for example, angle B is bigger than A/2 the teeth L will be located closer to the cutter edges 30 of the trailing teeth R than to the back edges 32 of the preceeding teeth R. Thus, the teeth L take over a larger part of the cutting work with a corresponding decrease of cutting work for the teeth R. Then the sideforce of the teeth L increases and that of the teeth R decreases. Consequently, for each associated pair of teeth R, L there will be a net sideforce directed towards the saw 1. In the case of texture-free material being sawed, this produces a curved sawing direction, i.e. to the right if viewed in the direction of feeding. In the case of inclined textured material being sawed with link-driving tooth-forces, the net sideforces (produced by the adjusted toothpitch-situation described above) produce a balancing of forces so that a straight cutting direction results. The situation will be reversed when angle B is less than A/2, i.e., there will occur a net sideforce directed toward the saw 2.

The mechanism for the driving unit and the control of angle B for the combination of the two identical but reversed saws 1, 2 is shown in FIG. 7. In first place, the driving nave comprises outer and inner nave-cylinders 5, 6. Both cylinders are mutually fixed and attached to bearing flanges 7 and 10 for the steering pins 14 and 15. As seen in FIG. 5, the bearing flanges 7 for the outer nave-cylinder 5 are formed with large oversized free-wheeling holes 34 for the steering pins 15 which are coupled to the inner nave-cylinder 6.

The middle parts of the two nave-cylinders have longitudinal through-slots 8 and 9, respectively (FIG. 7), in which a steering-pin 13 can be displaced axially in the nave by a center bar 12 coupled to it. One of the pair of slots 8 (or 9) in the outer (or inner) nave-cylinder has a slight helical screw-shape with such a lead that an axial and maximal displacement of the central control axis 12 produces a relative rotation between the two nave-cylinders of somewhat less than A degrees, i.e., a pitch displacement.

Of the outer ends of the nave 11 which are fixedly coupled to the inner nave-cylinder 6, at least one shall be bored for free passing of the control-bar 12. The other end can be direct coupled to a driving unit, for example a motor M shown in FIG. 4. In the general drawings, FIGS. 3 and 4, suitable locations for conventional sensing elements for detecting side-displacements of the saws have been noted with crosses (x). Because of the performance of such elements as well as coupling units with known PID-control for receiving the output-signal from the elements for driving of the control-bar 12 principally do not affect the invention they are not described in greater detail. However, the following mechanism may be considered an alternative to such control which is simple and advantageous from the viewpoint of cooling.

Aimed at the measuring points are suitably formed waterjets 38 which are fed from ordinary water-pipeline 40, 42 via adjustable valves V. The pipelines 40, 42 are parallel connected to mutual sides of a piston system 44, which is coupled to the control bar 12. For example, the control bar 12 may be directly connected with the piston element 46 as seen in the right section of FIG. 7. As the saw 1 or 2 approaches one of the waterjets, its discharge is restricted thereby diverting more flow to the piston, whereupon the center bar 13 is shifted to cause compensation for the misdirection of the saws. The valves V can also be mutually regulated to affect the desired steering pattern.

Apart from the case that the control bar 12 is force-controlled for manual or programmed curved-sawing, such controlled sawing can also be achieved by applying a controlled side movement to the position sensors which thus will control the control bar 12. This is possible if the saws are so formed that they can move slightly axially on the steering pins of the nave.

One key feature of the invention is that the main forces acting on teeth R and L are the tangential acting cutting force on the saw combined with the feeding force, and those are the only outer forces left. In other words, the sideforces acting upon the saw have been eliminated. It is thus clear that the risk of deflection of the blade resulting from the influence of the feeding force has been considerably reduced, i.e., the earlier discussed buckling effect is negligible. The bending moment of the feeding force then will be eliminated while sufficient control over the sawblade is exerted. By means of a suitable cutting angle and edge-sharpness the feeding force can be kept at a minimal value. The drive applied to the saw will be applied mainly in shear. Thus, the blade thickness can be reduced, and the width of the cut is thereby reduced along with sawdust losses. Blades can be used which are easily bent to conform to sharp curves.

In application forms like straight saws, for example band-saws and gang-saws, the two types of displacements of teeth according to the invention, pitch and feed, can be combined as well. This given then the possibility by using two pairs of sensing units, placed on each side of the workpiece to carry-through sawing along a screw-shaped plane if the workpiece can be turned or compensate for a varying texture along the sawcut.

An extra effect for decreasing the cutting work in saws, e.g., circular saws or other types, can be achieved according to the invention. For example, in a circular saw (FIGS. 1–2) this is done by mutually electrically insulating the two saws, R and L, and applying an electrical voltage between them. Thus, there will occur an electric field between the teeth in one of the blades and between the teeth in the other blade. A resulting electrical action between the teeth causes the wood to be heated and consequently more easily cut. Due to the sharp form of the teeth, the heating is concentrated at the edges of the teeth, i.e., where the cutting action is performed. This expedient is shown in FIG. 7 by insulating layers 16, 17, 18, 19, 20 which insulates the parts 12, 13, 5, 7, and 14 of the system from each other, as well as connected saws 1, 2. By connecting via a rubbing contact 21, or in other ways to the insulated saw an electrical current DC, AC or HF, there will arise, if the insulating units are made loss-free, a large field strength and heat activation in the cutting section at and between nearby toothtips. The insulation layer 20 disposed between the two saws can be fixed to one of the saws and made very thin, e.g., a thin mica sheet, because the saws rotate mutually only slowly and with a maximum of ±B degrees. In spite of the increase of the kerf due to the thickness of the insulation sheet, a total decrease of the kerf is foreseen via decreased cutting work and thinner saws. This heating technique, can with suitable modifications also be applied on other forms of saws, to make the wood less resistant to the sawblades. The heating technique can be applied to any two relatively insulated blades and thus has applicability with or without the pitch and feed displacement features of the invention, and regardless of whether the teeth are inclined in a more conventional manner.

Another key feature of the invention involves the use of mirror toothforms of the blades. The teeth of one group shall thus, when sawing texture-free material, produce a distinctive side force which counteracts the same sideforce of the other group. The amplitude of the sideforces from the two groups shall be of the same order. The sideforces of the one group are thus directed towards the forces of the other group which means that both groups are automatically pressed together and are combined to form a closed system.

The teeth shall be so formed that they, themselves, cause a pressing of the two sawblades against each other. This can principally be done in two different ways. According to one way, the teeth are given such angles that the feeding force presses the saw blades together. This is shown in FIG. 2. In the second and most effective way the teeth are so formed that the shearing force presses the saw blades together. This is shown in FIG. 8. Both ways can, of course, be used simultaneously. Especially in FIG. 2 but also in FIG. 8 the teeth fronts have been given an extreme angular form. This has been done only to show the construction clearly.

In operation, a controlled increase or decrease of the cutting work/cutting force of the two separated groups of the teeth R, L can be achieved as will now be described. As noted above, a neutral position is defined as the position when the two groups carry out equally big cutting work, i.e., the actual position when the mutual positions of the teeth of the groups are equal (equal circumferential spacing) and that the groups are placed side-by-side (equal radial extent) in the direction of the sawcut (FIG. 1).

Pitch Displacement

From the neutral position (FIG. 8A) the group of teeth is displaced in the one or the other direction, i.e., the teeth L are moved toward the back edges 32 of teeth R (FIGS. 8B, 8C) or toward the leading edges 30 of the teeth R (not shown). As a result, one or the other group of teeth will take over a bigger part of the cutting work.

This can be achieved by sliding the center bar 12 to the right or left in FIG. 7 whereby one of the nave-cylinders 5, 6 having a helical slot 8 or 9 is rotated relative to the other saw. The bar 12 can be moved manually or in response to a sensor.

Feed Displacement

Figure 8A:
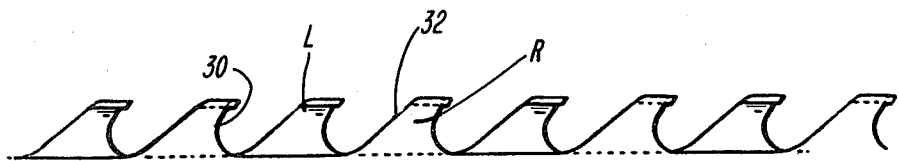
FIG. 8A depicts, in side view, the teeth of the cutting blades in a "neutral" position.
Figure 8B:
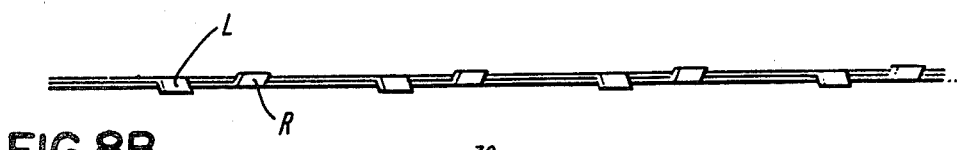
FIG. 8B depicts position of the teeth in plan.
Figure 8C:
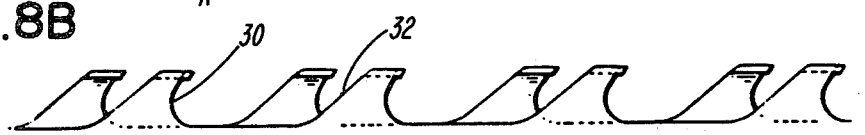
FIGS. 8C through 8F depict, in side view, various positions of adjustment of the teeth.
Figure 8D:
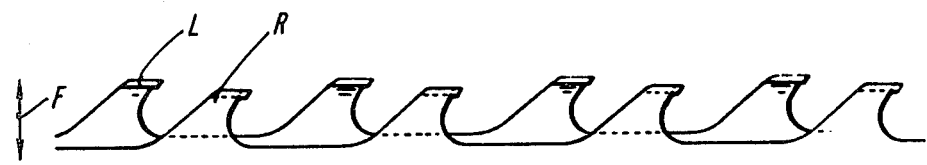

From the neutral position and in the direction of feeding F (FIG. 3) of the workpiece the teeth of the one group are displaced forward or backward in reference to the teeth of the other group (FIG. 8D). As a result, the one or the other group of teeth will take over a bigger part of the cutting work.

Figure 8E:
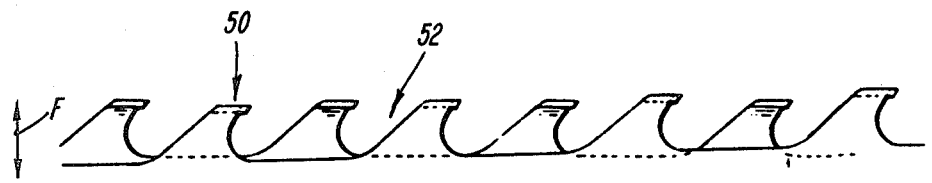

This feed displacement can be equal over the whole sawcut, shown in FIG. 8D, or the displacement can be unequally arranged so that from neutral position one group of teeth in one section 50 of the saw assembly is displaced forwardly (or backwardly) more than the other group of teeth while in another section 52 of the sawcut the one group is displaced less forwardly (or backwardly) compared to the other group of teeth (FIG. 8E).

Figure 8F:
Figure 9:
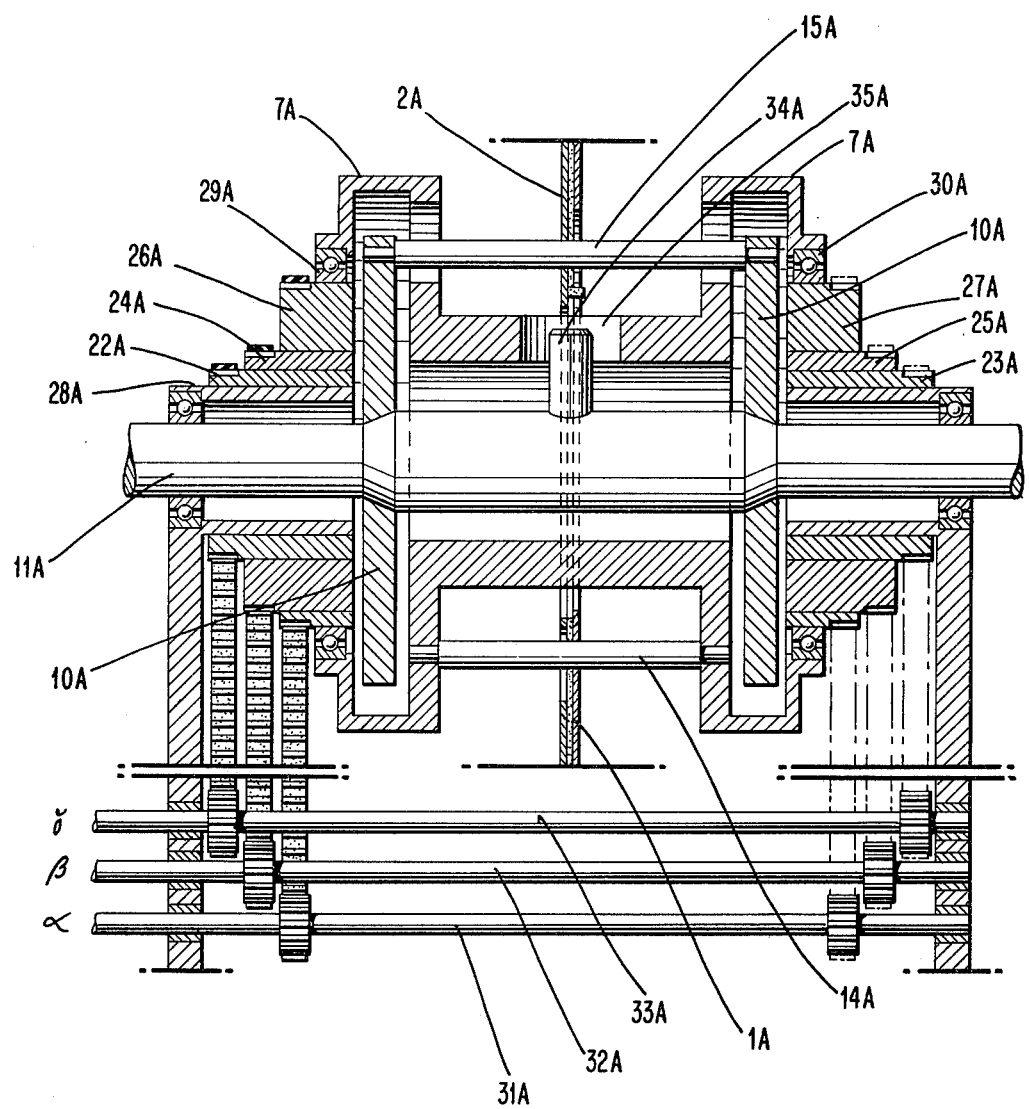
FIG. 9 is a longitudinal sectional view through another embodiment of the present invention depicting a mechanism for effecting a feed displacement of one blade relative to the other.
Figure 10:
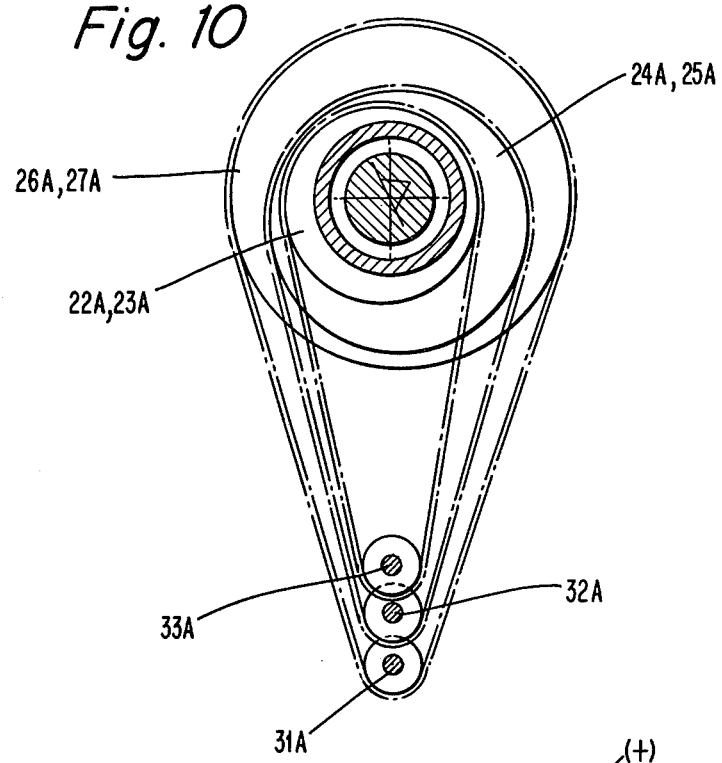
FIG. 10 is a schematic end view depicting the feed displacement mechanism according to FIG. 9.

In FIG. 8F the teeth are subjected to both a pitch displacement and a feed displacement.

As a result of the FIG. 8E position of adjustment it will be understood that from an intermediate position in the sawcut in one direction perpendicular to the sawing direction and increasing with the distance from the intermediate position, one saw will take over a bigger part of the cutting work. Towards the other direction in the sawcut there will occur an opposite effect. This position of adjustment of the teeth is used to solve the problems that occur when the texture of the workpiece in different sections of the cut causes unequal forces or forces in opposite directions. For texture-free material, such a position adjustment will form a screwing plane of the sawcut.

A feed displacement of the teeth R,L can be achieved in a circular saw by a displacement of the center of the axis of one or the other group of teeth in a manner to be described. If this displacement mainly is accomplished along the feeding direction of the sawing, the whole sawing direction will be influenced towards the one or the other direction. If the displacement mainly is done perpendicular to the feeding-direction of the sawing there will be a situation described above when from an intermediate position in the sawcut the teeth of the groups will act in one direction in one part of the sawcut and opposite in the other part.

By such changes the influences from variable texture and hardness of the workpiece can be counteracted and kept under control. Deviated cutting caused by unequally worn teeth, deformations of the front of the teeth, etc., can also be compensated for. This provides for an essentially increased side-stability. Lower pretensioning forces are needed but above all thinner blades can be used. The result will be planar and stable sawcuts and an increased saw-yield.

A preferred embodiment of the invention to perform feed-control for circular saws is shown in FIGS. 9, 10, 11, and 11A. Three pairs of eccentric nave-cylinders 22A and 23A, 24A and 25A, 26A and 27A are provided which can be independently and freely turned around a cylindrical part 28A of the frame, which frame is stationary and concentric to the main axis of the whole unit.

Figure 11:
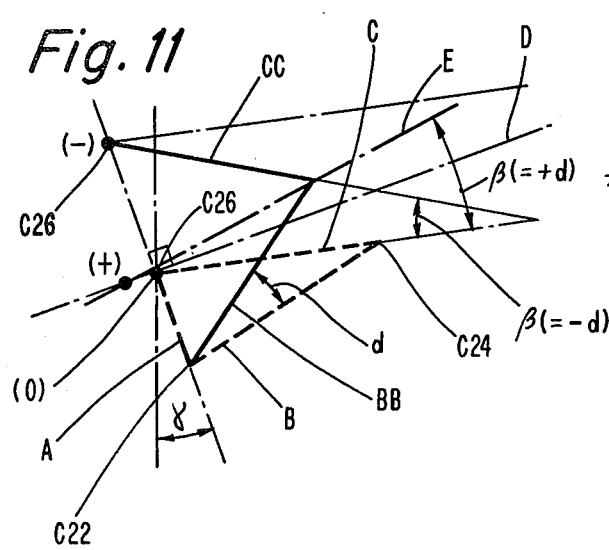
FIG. 11 is a graphic representation of the actuation of the feed displacement mechanism.
Figure 11A:
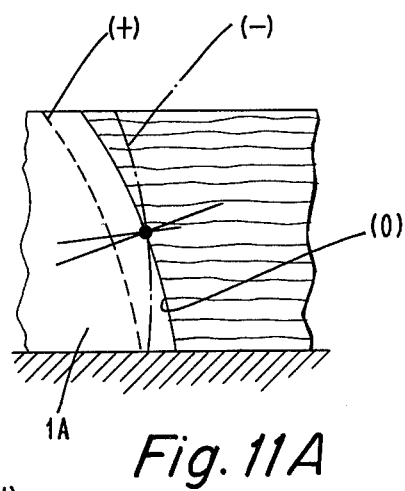
FIG. 11A is a schematic fragmentary view of a blade passing through a workpiece and representing two types of feed displacement.

The nave-cylinders 22A and 23A are rotatable eccentrically about the cylindrical part 28A of the frame. The nave-cylinders 24A and 25A are rotatable eccentrically about the nave-cylinders 22A and 23A. The nave-cylinders 26A and 27A are rotatable eccentrically about the nave-cylinders 24A and 25A. Via bearings, 29A and 30A, the outer pairs of eccentric cylinders, 26A and 27A carry a drive element 7A whose axis of rotation with certain limits can be placed anywhere aside from but parallel with the main axis. This element 7A carries one of the sawing blades 1A, with its pins 14A. This blade can now rotate around a displaced rotation axis. The direction of the lines through the centers of the nave-cylinders form angles alpha, beta, and gamma seen in FIG. 11. That is, the point 0 in FIG. 11 represents the axis of rotation of the shaft 11A and the blade 2A. The point 0 also represents the center C26 of the outer pairs 26A, 27A (and thus also represents the axis of rotation of the element 7A in the neutral condition of the assembly, i.e., when the blades 1A, 2A are coaxial. In this neutral condition, the point C22 represents the center of the pairs 22A, 23A and the point C24 represents the center of the pairs 24A, 25A. As can be appreciated from broken lines A, B, C in FIG. 11, the center C22 rotates about the point 0; the center C24 rotates about point C22; and the center C26 rotates about point C24. The pairs 26A-27A, 24A-25A and 22A-23A are controlled from outside via a driving mechanism including shafts 31A, 32A, and 33A, respectively. The eccentricities, i.e., the distance between the centers of the circles of the eccentrics, for the two outer pairs, 24A and 25A as well as 26A and 27A, are equal and suitably longer than for the inner pair 22A, 23A. That is lines B and C are equal and are greater than line A. As noted above, these eccentricities are represented by broken line vectors A, B, C in FIG. 11 with values of the angles gamma$>$0 and alpha=beta=0 in the neutral condition. The axis of rotation of the outer element 7A, which rotates the right-hand blade 1A, coincides with the axis of rotation for the inner element 10A, with its blade 2A, and steering pins 15A. At opposite but equal increases of the angles alpha (counterclockwise) and beta (clockwise), represented by solid vecotrs BB, CC in FIG. 11, the axis of rotation C26 of the outer element 7A, will be displaced upwards along the elongation of the gamma-vector A to a point marked (−). At equal decreases of vectors BB, CC the displacement will be directed downwards along the same line A. The direction of an imaginary line D perpendicular to line A shall be adjusted so that it will pass through the midpoint of the sawing cut and then a feed-displacement shown in FIG. 8E will be produced. As also has been shown in FIG. 11 with a dot-dashed beta-vector E, it is clear that at equal changes of the alpha- and beta-angles in the same direction of rotation of vectors B and C, the axis of rotation of rotation C26 of the element 7A, will be displaced along a line perpendicular to the gamma-vector passing origo to a point marked (+). The positions of the sawing cuts of the regulated blade 1A resulting from the above-described changes are represented in FIG. 11A.

Displacement of the given vectors B and C is achieved by driving the axles 31A and 32A in response to signals from position sensors for the blade, marked with crosses in FIG. 3. Displacement of vector A is achieved by driving the axle 33A in response to signals from a height-sensor on the sawn object. The signals from the sensors steer these driving axles with such limitations that overcontrol will not occur. The two elements 7A and 10A are given synchronous rotations by means of the one-way steering pin 34A, which is fixedly connected with the element 10A and its driving axle 11A. The pin 34A is situated in a recess 35A in the outer element 7A. If capacity for pitch-displacement is desired, the steering-pin 34A and the recess 35A are formed as earlier described in connection with FIG. 7, wherein sliding movement of the pin 34A within the element 7A and relative to the element 10A produces rotation of the former relative to the latter.

Figure 12:
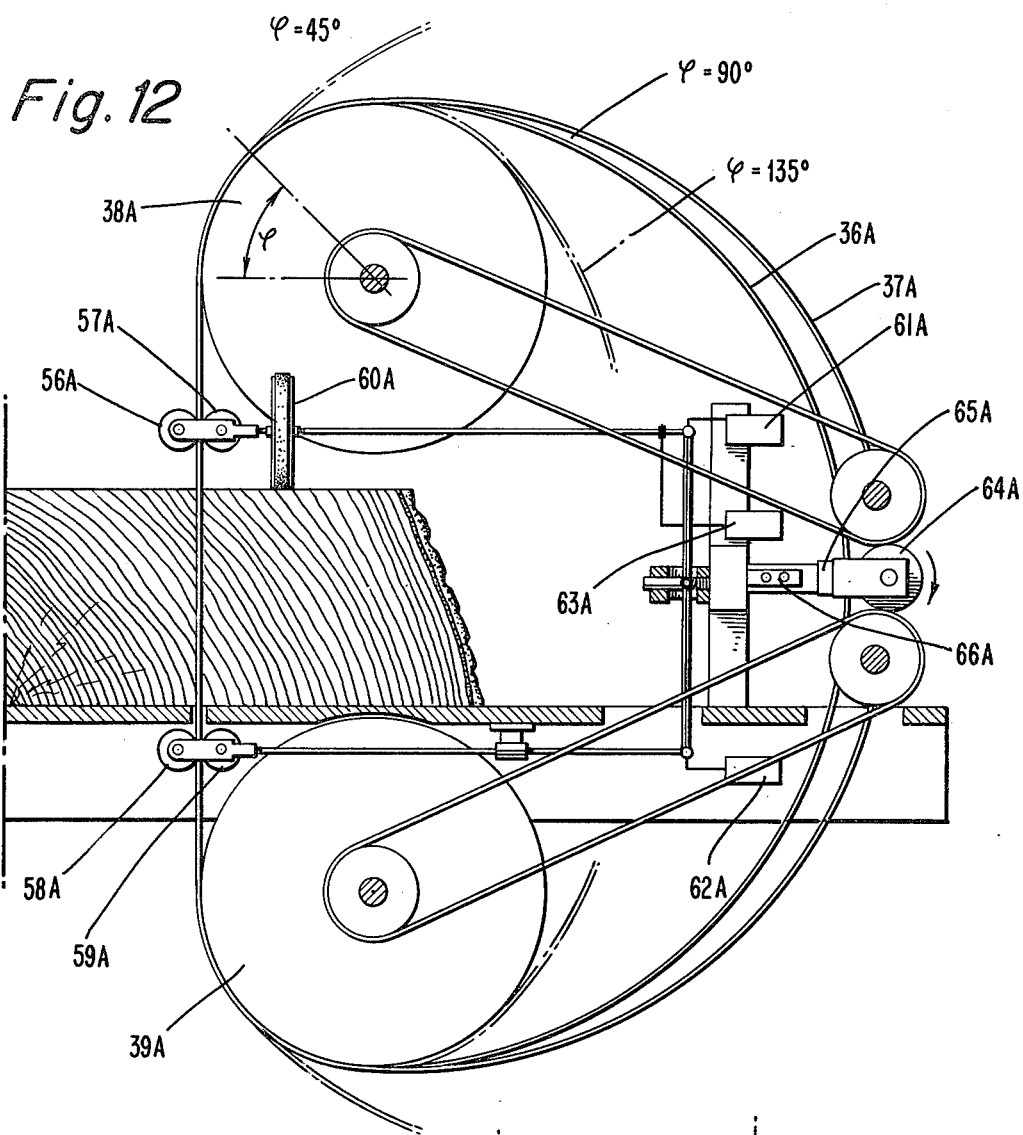
FIG. 12 is a side elevational view of another embodiment of the invention depicting a pair of band saws having capacity for feed and pitch displacement.
Figure 13:
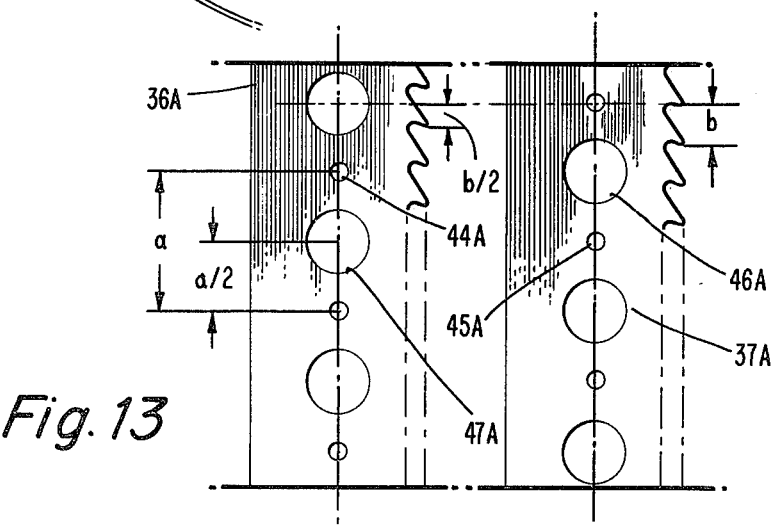
FIG. 13 is a fragmentary side view of the band saws of FIG. 12.
Figure 14:
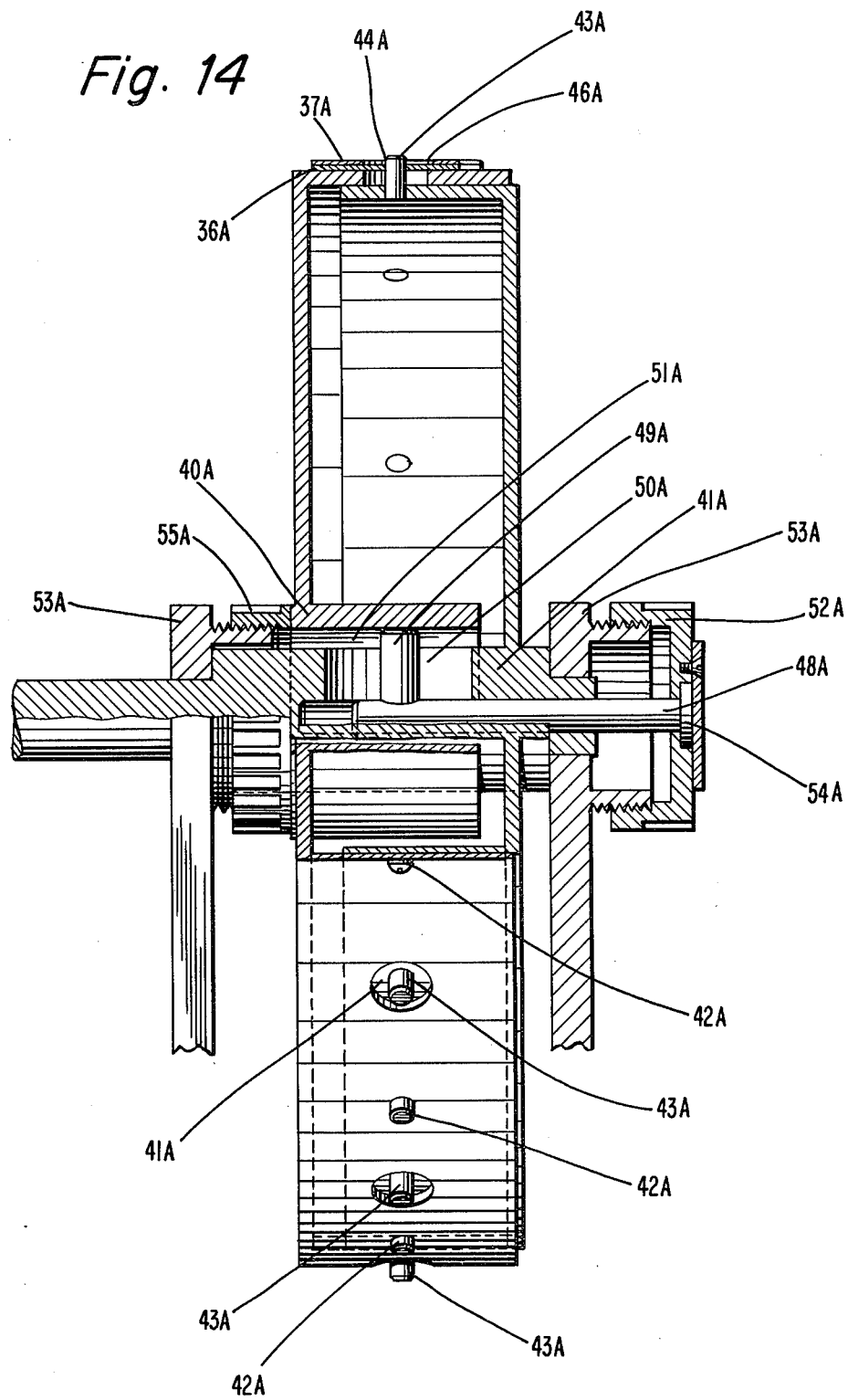
FIG. 14 is a partial longitudinal sectional view through one of the blade support rolls depicted in FIG. 12 and illustrating in detail a pitch and feed displacement mechanism.

An example of one manner of employing the invention in connection with band-saws is shown in FIGS. 12 to 14. Two primarily straight sawblades 36A and 37A of unequal lengths have been combined and installed onto rolls 38A and 39A. When forming the blades and rolls are described below, the stretching of the blades is straight between front sides of the rolls, and circulary arched around back sides of the rolls with the blades circulary bent and free-hanging. The number of teeth in the inner blade is less than that of the outer, but the toothpitch is equal.

To obtain a pitch-displacement (see FIG. 14), each of the rolls 38A and 39A, in one embodiment, has been formed as two concentric cylinders 40A and 41A. Each cylinder is provided around its periphery with symmetrically placed, outwardly protruding carrier pins 42A (in cylinder 40A) and 43A (in cylinder 41A). The pins 42A, 43A pass through holes 44A, 45A, respectively, in the blades 36A and 37A (see also FIG. 13). The holes admit the pins with slight clearance. For a good fit, the pins are shaped slightly conically. In a neutral position the two cylinders 40A and 41A have such a mutual angle-position, that their pins are equally spaced. The pins 42A drive the blade 37A via the holes 45A, while the pins 43A drive the blade 36A via the holes 44A. The pins 42A project through enlarged holes 47A in the blade 36A so as to have no driving influence upon the blade 36A. Correspondingly, the pins 43A project through enlarged holes 46A in the blade 37A.

Pitch displacement from such a neutral position between the two cylinders 40A and 41A is done in the same way as described in connection with circular-sawing (FIG. 7) in that a central steering-pin 49A slides in a slightly helicoidal slot 50A in the inner cylinder 41A. The outer part of the steering pin 49A travels in an appropriately straight slot 51A in the outer cylinder 40A. An axial displacement of the steering pin 49A along one of the two directions of the steering axis 48A creates a relative pitch-displacement between the two blades 36A and 37A and correspondingly controlled sideforces for texture compensation and/or curved sawing, as earlier described.

Displacement of the axis 48A can be externally effected by a suitable steering-motor which rotates a screw-threaded steering socket 52A, fixed to the frame 53A. The axis 48A and its end 54A can freely rotate in the steering socket 52A. The two steering sockets 52A in the rolls 38A and 39A, shall be given synchronous rotations. Alternatively, the regulation in the non-driving roll 38A can be excluded by omitting the pin 49A.

On the other hand, to obtain a feed displacement, a similar and also motor-controlled screw threaded steering socket 55A, fixed to the frame 53A, is used. The inner diameter of the steering socket 55A is somewhat bigger than the outer diameter of the inner central part of the cylinder 41A. Thus, the steering socket can axially displace the outer cylinder 40A and its pins 42A, the latter projecting with clearance through the hole 47A, in the other blade 36A. The pins 43A of the inner cylinder 41A are free-running in the holes 46A in the activated blade 37A. Because of the components of the cutting force directed against the blade 37A, the axially free sliding cylinder 40A always keeps contact with the steering socket 55A. In the two roller systems 38A and 39A, the rotations of the steering sockets shall not be synchronized except in the special case with equally big feed displacement along the whole sawcut, i.e., at constant texture disturbance and/or curved sawing along a non-helical plane.

To obtain adequate information for the feed displacement control and (in the same way as in the examples with circular saws) measurements are made of an upper and lower deflection from the normal position of the blades as well as a measurement of the thickness of the workpiece. This is achieved by rolls 56A to 60A which, via an adapted and easily prestressed link-and steering system, are connected to the signal sensors 61A, 62A, and 63A. Also the roll 60A can be used for measuring the feed-speed which directly influences the mean cut depth of the teeth in the workpiece. In a feed displacement condition, this depth shall not exceed half of the height of the cutting section of the tooth. An outer driving motor (not shown) for the whole system is flexibly connected to an intermediate driving wheel 64A rotating in a spring stressed guiding unit 65A with a blocking arrangement 66A for exchanging blades. The prestress of the guiding unit 65A via a spring and/or via the weight of the blocking unit and thus also the prestress of the blades 36A and 37A between the roll systems 38A and 39A can be small. It is a central character of the invention that by the described teeth displacements a sawing unit is provided which is not influenced in a sideways direction. It travels straight through the material without deflection towards one side or the other.

The motor-power is transferred to the driving wheel 64A which is driving the saw. Thus, the power is directly transferred to the teeth and their cutting action. Accordingly, the power from the motor is used efficiently without specific losses. Also at the same time, a stretching of the sawblades is initiated. This is a definite advantage in relation to conventional band-saws, where the stretching of the blades is reached by hard pretensioning.

Although the invention has been described in connection with a preferred embodiment thereof, it will be appreciated by those skilled in the art that modifications, additions, substitutions and deletions not specifically described may be made without departing from the spirit or scope of the invention as defined in the appended claims. For example, the toothedges can be connected to the circular-sawblade in different ways; also, the individual teeth can be formed as knives and cutters, etc. Also the circular-sawblade can be varied. Through that the saw by the controllable action of the teeth by itself is finding its determined way through the workpiece. The circular-sawblade as earlier has been pointed out is only exposed to small stresses and therefore this organs can be made very thin, possibly also being replaced by spokes, etc. Regarding arrangements for manual or automatic control many variations with known technics for steering and control can be developed. As a matter of course such variants are included in the invention.

What is claimed is:

1. A sawing unit comprising two sawblades having a plurality of teeth with equal toothpitch, said blades being pressed together and driven as a unit, the teeth of either blade disposed between a pair of teeth of the other blade, the teeth of each blade being inclined toward the plane of the other blade, said blades being mounted for relative displacement both in the direction of travel of said teeth and in the direction of feed of the object being sawed during a sawing operation, actuating means operably connected to at least one of said blades for effecting relative displacement between said blades selected in said direction of travel of said teeth and in said direction of feed during a sawing operation to regulate the cutting action of the teeth.

2. A sawing unit according to claim 1 including sensing means for activating said actuating means in response to a detected deviation of said blades from a reference position.

3. A sawing unit comprising two sawblades having a plurality of teeth with equal toothpitch, said blades being pressed together and driven as a unit, the teeth of either blade disposed between a pair of teeth of the other blade, the teeth of each blade being inclined toward the plane of the other blade, means for effecting relative displacement between the blades in the direction of feed of the object being sawed, and position indicating sensors disposed for sensing the orientation of said blades relative to an object being sawed, said sensors operably connected to said displacement effecting means to actuate the latter in response to a preselected orientation deviation of said blades.

4. A sawing unit according to claim 3, wherein said sensors are adjustably movable toward and away from the planes of said blades.

5. A sawing unit comprising two sawblades having a plurality of teeth with equal toothpitch, said blades being pressed together and driven as a unit, the teeth of either blade disposed between a pair of teeth of the other blade, the teeth of each blade being inclined toward the plane of the other blade, an actuator operably connected to at least one of said blades, and means for moving said actuator for displacing said at least one blade relative to the other blade in the direction of travel of said teeth to adjust the spacing between the teeth of the two blades.

6. A sawing unit according to claim 5, including position indicating sensors disposed for sensing the orientation of said blades relative to an object being sawed, said sensors operably connected to said actuator to actuate the latter in response to a preselected orientation deviation of said blades.

7. A sawing unit according to claim 6, wherein said sensors are adjustably movable toward and away from the planes of said blades.

8. A sawing unit according to claim 5, wherein said actuator comprises a bar connected to said motor to be longitudinally moved thereby, and means interconnecting said bar and said at least one blade for moving the latter in the direction of travel of the teeth in response to longitudinal movement of said bar, said means for moving said actuator comprising a motor operably connected to said bar.

9. A sawing unit comprising two sawblades having a plurality of teeth with equal toothpitch, said blades being pressed together and driven as a unit, the teeth of either blade disposed between a pair of teeth of the other blade, the teeth of each blade being inclined toward the plane of the other blade, said blades being mutually displaceable in the direction of travel of said teeth to adjust the spacing between the teeth of the two blades, means for effecting said relative displacement between the blades in the direction of travel of the teeth, and position indicating sensors disposed for sensing the orientation of said blades relative to an object being sawed, said sensors operably connected to said displacement effecting means to actuate the latter in response to a preselected orientation deviation of said blades.

10. A sawing unit comprising two sawblades having a plurality of teeth with equal toothpitch, said blades being pressed together and driven as a unit, the teeth of either blade disposed between a pair of teeth of the other blade, the teeth of each blade being inclined toward the plane of the other blade, means for effecting relative displacement between the blades in the direction of travel of said teeth, and position indicating sensors disposed for sensing the orientation of said blades relative to an object being sawed, said sensors operably connected to said displacement effecting means to actuate the latter in response to a preselected orientation deviation of said blades.

* * * * *

UNITED STATES PATENT AND TRADEMARK OFFICE
CERTIFICATE OF CORRECTION

PATENT NO. :   4,436,009
DATED      :   March 13, 1984
INVENTOR(S) :  Jonas W. Ask It is certified that error appears in the above-identified patent and that said Letters Patent is hereby corrected as shown below:

Add the following on the face of the patent:

-- Foreign Application Priority Data

June 20, 1979        Sweden . . . . . . 7905412 --

*Signed and Sealed this*

*Twenty-sixth* Day of *June 1984*

[SEAL]

*Attest:*

GERALD J. MOSSINGHOFF

*Attesting Officer*          *Commissioner of Patents and Trademarks*